United States Patent Office

3,726,712
Patented Apr. 10, 1973

3,726,712
DOUBLE COATED ELECTRICAL CONDUCTOR
Robert E. Rieck, Naperville, Ill., and Edwin F. Morello, Whiting, Ind., assignors to Standard Oil Company, Chicago, Ill.
No Drawing. Filed May 26, 1971, Ser. No. 147,239
Int. Cl. B44d 1/18; C08g 20/32
U.S. Cl. 117—218
10 Claims

ABSTRACT OF THE DISCLOSURE

Insulated electrical conductors having a base coat of a polyamide-imide or polyamide prepared by reacting at elevated temperature (1) trimellitic anhydride or isophthalic acid or mixtures thereof. (2) diprimary aromatic diamines and (3) lactams or amino acids cured on the conductor and an overcoat of a polyamide-imide resin cured on the base coat, said polyamide-amide being the reaction product of (I) a trimellitic acid derivative and (II) a diprimary diamine or trimellitic anhydride and an aromatic diisocyanate.

---

The novel polyamide-imides or polyamides base coat incorporates linear units similar to structures A and B below, but some cross-linking is not excluded. These polymers contain various structures but structures A and B are representative.

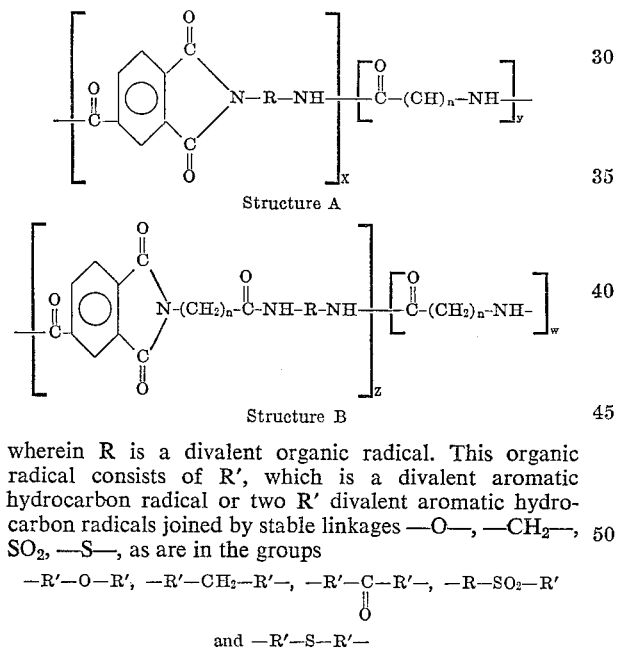

Structure A

Structure B wherein R is a divalent organic radical. This organic radical consists of R', which is a divalent aromatic hydrocarbon radical or two R' divalent aromatic hydrocarbon radicals joined by stable linkages —O—, —CH$_2$—, SO$_2$, —S—, as are in the groups —R'—O—R'—, —R'—CH$_2$—R'—, —R'—C—R'—, —R—SO$_2$—R'
$\qquad\qquad\qquad\qquad\qquad\qquad\quad\;\;\|$
$\qquad\qquad\qquad\qquad\qquad\qquad\quad\;\;$O and —R'—S—R'—

The value for $n$ can range from 1 to about 30, preferably 3 to 10. X and Z have to be at least 1 but the maximum value can range to an excess of 100. The values for Y and W can be zero or any integer, usually the value for Y and W is about 3 to 10 but it can exceed 20.

This invention relates to resins and combinations of resins and to their use in electrical insulation. More particularly, this invention relates to electrical insulation, to electrical conductors containing in combination a base insulation coat and an over insulation coat, said overcoat being a polyamide-imide resin and said base coat being a polyamide-imide or polyamide.

Synthetic resins suitable for use as electrical insulating materials, particularly materials which are satisfactory for use as slot insulation in dynamoelectric machines and for use as insulation for conductors which are to be employed as magnet wires (insulated electrical conductors) in electrical apparatus must be able to withstand extremes of mechanical, chemical, electrical and thermal stresses. Thus, wires to be employed as coil windings in electrical apparatus are generally assembled on automatic or semi-automatic coil winding machines which, by their very nature, bend, twist, stretch and compress the enameled wire in their operation. After the coils are wound, it is common practice to coat them with a varnish solution containing solvents such as ketones, alcohols, aliphatic and aromatic hydrocarbon, halogenated carbon compounds, etc. Magnet wire insulation must be resistant to these solvents. In order to conserve space in electrical apparatus, it is essential that the individual turns which make up the coils be maintained in close proximity to each other. Because of the closeness of the turns and the fact there may be a large potential gradient between adjacent turns, it is necessary that the resins employed as wire enamels have high dielectric strength to prevent short circuiting between adjacent coated wires. In the operation of electrical apparatus containing coiled wires, high temperatures are often encountered and the enamels must be able to withstand these high temperatures as well as the mechanical stresses and vibrations encountered in electrical apparatus so that the enamel coating does not soften, crack, or come off the wire.

We have now discovered that coatings with improved solvent resistance and coatability can be obtained by first applying and curing a polyamide-imide or polyamide base coat prepared by heating (1) trimellitic anhydride or isophthalic acid or mixtures thereof, (2) diprimary aromatic diamines and (3) lactams or amino acids and then applying to the base coat and curing an overcoat of a polyamide-imide polymer of a trimellitic acid derivative and a diprimary aromatic diamine or trimellitic anhydride and an aromatic diisocyanate.

A surprising feature of this invention is that the overcoated wire enamel provides much improved solvent resistance when compared to the polyamide-imide or polyamide base coat alone. This is shown by the fact that the overcoated electrical insulation conductor can pass the 30 second immersion test in dimethylacetamide without cracks or crazes whereas the sole coated polyamide-imide or polyamide polymer is seriously attacked by the solvent dimethylacetamide.

Coating difficulties are encountered when the polyamide-imide overcoat enamels are used as the sole insulation on the conductor. The polyamide-imide polymer tends to blister and produce a rough coating. This can result in the production of much enameled wire which is unacceptable for commercial use. As a result the high thermal stability and chemical resistance of these polymers cannot be fully utilized. Coating the polyamide-imide or polyamide base coat enamel on the conductor significantly reduces the presence of blisters and other imperfections when the polyamide-imide overcoat enamel is subsequently applied and cured.

The thickness of the polyamide-imide overcoat should not be less than about 10% of the thickness of the total insulation applied to the conductor. Preferably, the thickness of the polyamide-imide overcoat should be about 15–30% of the total insulation. The polyamide-imide overcoat should normally not be greater than 40% of the total insulation thickness.

The composition of a polyamide-imide or polyamide base coat having lactams or amino acids incorporated into the polymer chain and a polyamide-imide overcoat upgrades the usefulness of the polyamide-imide polymers as wire enamels.

The polyamide-imides or polyamide base coat polymers may be described as polyamide-imides or polyamides produced advantageously by heating in a solvent the following three reactants: (1) trimellitic anhydride or isophthalic acid, or mixtures of both, (2) diprimary aromatic diamines and (3) lactams or amino acids. The molar ratio of the trimellitic anhydride varies from about 1:1:0.3 to about 1:1:2.5, preferably from about 1:1:0.4 to about 1:1:1.8.

The ratio of the diprimary diamine to the isophthalic acid or trimellitic anhydride is preferably equimolar. Variations with limits of plus or minus three mole percent of either of these reactants will usually have only minor effect on product properties. Variations as high as plus or minus ten mole percent may be suitable for less demanding application than wire coating enamels from the standpoint of high flexural requirements. The polymer aliphatic content can be varied by the amount of caprolactam added and a wide range of polymer properties are possible. The aliphatic content of the polymer can vary from about 5 to about 50 percent of the total weight of the total polymer.

The novel polyamide-imides or polyamides base coat incorporate linear units similar to structures A and B below, but some cross-linking is not excluded. These polymers contain various structures but structures A and B are representative.

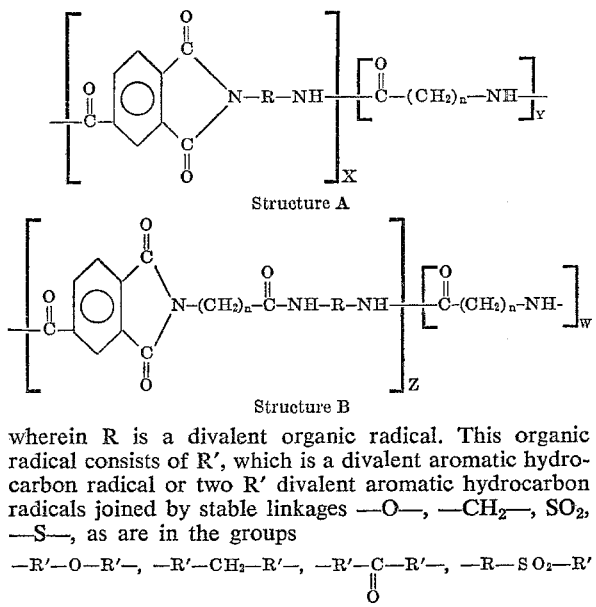

Structure A

Structure B wherein R is a divalent organic radical. This organic radical consists of R', which is a divalent aromatic hydrocarbon radical or two R' divalent aromatic hydrocarbon radicals joined by stable linkages —O—, —CH$_2$—, SO$_2$, —S—, as are in the groups —R'—O—R'—, —R'—CH$_2$—R'—, —R'—C—R'—, —R—SO$_2$—R'
$$\qquad\qquad\qquad\qquad\qquad\qquad\quad \overset{\|}{O}$$

and
$$\qquad -R'-S-R'-$$

The value for $n$ can range from 1 to about 30, preferably 3 to 10. X and Z have to be at least 1 but the maximum value can range to an excess of 100. The values for Y and W can be zero or any integer, usually the value for Y and W is about 3 to 10 but it can exceed 20.

The process for preparing the polyamide-imides or polyamides base coat polymer comprises heating at elevated temperatures in a solvent in the presence of at least 0.01% catalyst of the group boric acid, boric anhydride, polyphosphoric acid, phosphoric acid, trialkyl phosphite, triaralkyl phosphite, triaryl phosphite and trialkaryl phosphite (A) trimellitic anhydride or isophthalic acid, (B) diprimary aromatic diamines and (C) lactams or amino acids wherein the molar ratio of trimellitic anhydride to the aromatic diamines to the lactams or amino acids is about 1:1:0.3 to about 1:1:2.5.

The polyamide-imide or polyamide forming reaction is carried out at a temperature of about 200 to 250° C. and preferably in the range of about 220° to 235° C. when atmospheric pressure is used. The reaction is conducted at as high a solids concentration as conveniently possible, preferably at least 70% so that a sufficiently high reaction temperature is attainable at atmospheric pressure.

The catalyst used is present in an amount of at least about 0.01% and usually about 0.01 to 4% based on the weight of reactants and preferably 0.4 to 1.5% on this basis. Lead monoxide, boric acid, boric anhydride, phosphoric acid, polyphosphoric acid, triaryl phosphites and trialkaryl phosphites such as triphenyl and tritolyl phosphites as well as trialkyl phosphites and triarylalkyl phosphites such as tribenzyl phosphite are catalysts which are useful in the process of this invention. Preferably, the individual alkyl groups of the trialkaryl-, trialkyl- and triarylalkyl phosphites are lower alkyl groups containing about 1 to about 7 carbon atoms. Boric acid, boric anhydride, triphenyl phopshite and lead monoxide are the preferred catalysts.

The aromatic diprimary diamines useful in this invention have one or more aromatic rings and two primary amino groups. These aromatic diamines have the formula

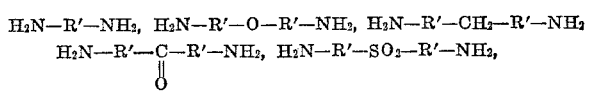

and

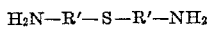

wherein R' is a divalent aromatic hydrocarbon radical hereinbefore indicated.

The catalysts can be added to the reaction vessel initially along with the reactants and solvent or can be withheld until the reaction temperature is reached. The catalysts are preferably added after reaction temperature has been reached and maintained for a few hours. Apparently, the catalysts of this invention are most effective if added after reaction temperature is reached and maintained for a substantial length of time. Solvents useful in this invention are high boiling liquids such as N-methylpyrrolidone, dimethylacetamide, dimethyl formamide, dimethyl sulfoxide, cresylic acids, or meta and para cresol which dissolve all three reactants and permit a reaction temperature above 200° C. The preferred solvents are N-methylpyrrolidone, meta cresol and cresylic acid.

Generally the diprimary aromatic diamines have from 1 to about 4 aromatic rings and advantageously from 1 to about 2 aromatic rings. The diprimary aromatic diamine having more than one aromatic ring may be further characterized as polycyclic aromatic compounds having two primary amino groups on an inter-connected polycyclic aromatic nucleus. Aromatic rings may be interconnected by condensation as a naphthalene or phenanthrene or may be bridged directly as in diphenyl diamines, or indirectly as, for example 2-R' groups joined with stable inert linkages such as oxy, alkyl, carbonyl, sulfonyl or sulfide, and other groups as hereinbefore described. The alkyl group may be illustrated by methylene, and ethylene substituted derivatives such as dimethylmethylene and the like.

Lactams useful for the novel process include butyrolactam, caprolactam, capryllactam, lauryllactam. Amino acids can be used in place of lactams, 4-amino butyric acid is a representative amino acid. The incorporation of these lactams or amino acids in the novel polymer render a polymer with good flexural properties and improved coatability over the aromatic polyamide-imide polymers.

The polyamide-imide overcoat polymers may be described as polyamides having some polyimide linkages; said polyamides are capable, when heated, of conversion to the polyamide-imide form. Such polyamides are high molecular weight polymeric compounds having in their molecules units of

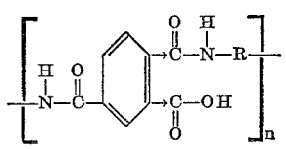

wherein → denotes isomerism and wherein R is a divalent aromatic organic radical. This organic radical consists of R', which is a divalent aromatic hydrocarbon radical or two R' divalent aromatic hydrocarbon radicals joined by stable linkages

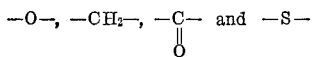

as are in the groups

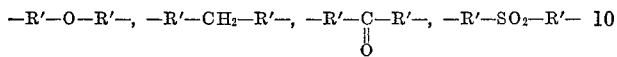

and

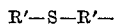

The molecular weight of these polyamides is sufficiently high to produce upon heating a film-forming polymer. Said amides are susceptible to condensation by heating to a polyamide-imide having to a substantial extent recurring units of

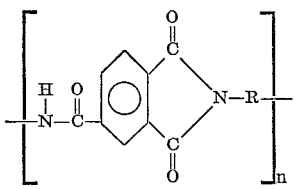

wherein R is a divalent aromatic organic radical in which in addition to hydrogen and nitrogen, sulfur and oxygen atoms can be attached to the carbon atoms. This organic radical consists of R', which is a divalent aromatic hydrocarbon radical or two R' divalent aromatic hydrocarbon radicals joined by stable linkages

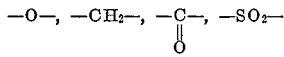

as are in the groups

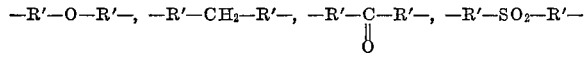

and

The polyamide-imides are suitably prepared by reacting an acyl derivative of the benzene tricarboxylic acid anhydride and an aromatic diamine in the presence of organic solvent such as alkyl substituted phenols, commercial ortho, meta or para cresol, N,N-dimethylacetamide, N-methylpyrrolidone, dimethyl sulfoxide and the like. The reaction is suitably carried out at a temperature of about 0° to 70° C. The structure of the amine also affects the rate of reaction. The preferred primary aromatic diamines are p,p'-methylenebis(aniline), p,p'-oxybis(aniline), m-phenylenediamine and p,p'-amino phenylsulfone. The preferred solvents are N-methylpyrrolidone and dimethylacetamide, even though phenol, o-, p-, m-cresols, xylenols, either singly or as mixtures thereof commonly known as cresylic acids may be used. The reactants are preferably present in essentially an equimolar ratio. Variations with limits of plus or minus 3 mole percent of either starting material will usually have only minor effects on product property. Variations as high as plus or minus 10 mole percent may be suitable for less demanding applications than wire coating enamel from the standpoint of high flexural requirements. After the reaction has taken place a neutralizing agent such as alkylene oxide can be added to scavenger the hydrogen halide produced by the reaction. The polymers as formed have an amide content which varies from 55 to 100% and the imide content is from 0 to 45 percent. The polyamide-imide after heat curing theoretically contains 50 percent amide linkages and 50 percent imide linkages.

The first type of polymers produced may be defined as those soluble in organic solvents and capable of further reaction upon application of heat. The second type of polymers—the polyamide-imides used as overcoat—are much less soluble than the amides and when they have been heat cured they are generally insoluble in organic solvents and may be regarded as cured end-product in the way of coatings. The latter are characterized by resistance to solvents, by high thermal stability and good electrical characteristics.

The acyl halide derivatives are reacted in solvent with an aromatic diamine having one or more aromatic rings and two primary amino groups. These aromatic diamines have the formula

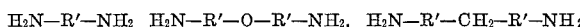
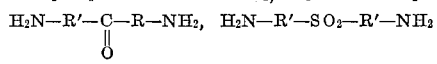

an

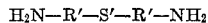

wherein R' is a divalent aromatic hydrocarbon radical hereinbefore indicated. The aromatic content of the diamine provides the thermal properties in the polymer while the primary amino groups permit the desired imide rings and the amide linkages to be formed in the polymers. Generally the aromatic diamine has from one to about four aromatic rings, advantageously from one to about two aromatic rings.

These polyamide-imides can also be prepared by reacting trimellitic acid anhydride with diisocyanates in one of the aforementioned solvents at a temperature of about 150 to 300° F. The monomeric diisocyanates are reacted with trimellitic acid anhydride. The following are examples of useful diisocyanates: aliphatic diisocyanates such as butane-, hexane- and heptane diisocyanate, aliphatic diisocyanates with a built in ring system such as w,w'-diisocyanate-1,3-dimethylbenzene, w,w'-diisocyanate - 1,4-dimethylcyclohexane, w,w'-diisocyanate - 1,4 - diethylbenzene and cyclohexane-1,3-cyclohexane-1,4-, 1-methylcyclohexane-2,4- and dicyclohexylethane 4,4'-diisocyanates. In addition, there may be mentioned mixed aromatic aliphatic and aromatic hydroaromatic diisocyanates such as 4-phenylisocyanate-methylisocyanate, tetrahydronaphthylene-1,5, hexahydrobenzidine-4,4'- and hexahydrodiphenylmethane-4,4'-diisocyanates, also diisocyanates of benzene and its homologues; for example, 1,3-phenylene-, 1,4-phenylene-, 1-methylene-benzene-2,4- and 1-methylbenzene-2,6-diisocyanate and mixtures of their isomers, mono-, di- and triisopropyl- benzyl-diisocyanates, polyisocyanates of naphthalene of diphenyls and of di- and tri-phenylmethane with polynuclear ring systems or of polyphenyl compounds. Examples of the last mentioned classes of substances are naphthalene-1,4-, naphthalene-1,5, diphenyl-4,4'-, diphenylmethane-4,4'-, anthraquinone-2,6- and diphenylsulphide-2,4-diisocyanates, 4,4'-dimethyldiphenylmethane-2,2'-diisocyanates. The polyisocyanates used according to the invention may also be substituted by halogen-, alkoxy-, azo-, nitro-, cyano-, ester- or sulfonic groups. Examples of these are 1-chlorobenzene-, 1-nitrobenzene- and 1-methoxybenzene-2,4-diisocyanate and benzidine sulfonic 4,4'-diisocyanate. Polyarylpolyisocyanates are preferred. Advantageously, the isocyanato groups are in the meta or para position in the aromatic nucleus and particularly on separate rings when the nucleus has more than one aromatic ring. The preferred diisocyanates are 4,4 methylenebis phenyl-diisocyanate, 4,4 oxybis phenyl-diisocyanate, 1,4-phenyl diisocyanate, 1,3-phenyl diisocyanate, diphenylmethane 3,3'-diisocyanate, diphenyl-methane, 4,4'-diisocyanate, diphenylether 3,3'-diisocyanate, diphenylether 4,4'-diisocyanate, naphthalene diisocyanate, diphenyl 1,4-diisocyanate, diphenyl 1,3 - diisocyanate, diphenylketone-3,3'-diisocyanate, diphenylketone 4,4'-diisocyanate.

The invention is further illustrated by the following examples.

Example I describes the preparation of the polyamide-imide overcoat polymer.

EXAMPLE I 3361 parts by weight of N-methylpyrrolidone and 1199 parts by weight of semi-refined coal-tar distillate, having a boiling range of 165 to 235° C. were charged to a lined reactor equipped with an agitator cooling-heating jacket and a nitrogen gas inlet tube. 886 parts by weight of methylene dianiline were dissolved in the solvents. At this point, the solution temperature was 62° F. 940 parts of weight of 4-trimellitoyl chloride was added over a 5-hour period with cooling water on the jacket. At the end of the addition, the solution temperature had risen to 90° F. The solution was stirred for 55 minutes, and the addition of a solution of 299 parts by weight of propylene oxide in 234 parts by weight of N-methylpyrrolidone was begun. The reaction mass temperature was controlled by cooling water over the 125-minute addition period to a maximum of 105° F. The solution was allowed to sit until the viscosity dropped to an equilibrium value. 493 parts by weight of sample was then withdrawn for special test purposes. 134 parts by weight of a semirefined coal-tar distillate and 310 parts by weight of N-methylpyrrolidone were then added to dilute the product to 12 poises. The product was filtered and collected.

Examples II through VI illustrate the preparation of the base coat polymer.

EXAMPLE II

A mixture of 148.5 g. (0.75 mole) of methylenebisaniline, 135 g. (1.19 mole) of E-caprolactam, and 200 gm. of N-methylpyrrolidone was prepared in a 2 liter three neck flask equipped with a stirrer and nitrogen purge system. A silicone oil bath was used for heating. The temperature was increased to 100° C. and stirring continued until a homogeneous solution resulted. 144 g. (0.75 mole) of trimellitic anhydride was then added in 3 or 4 portions over 20 minutes. The reaction exotherm increased the temperature to 115.0° C. External heat was then applied to raise the temperature to 220° C. Water of imidization began to distill at 160° C. Over a period of about one and one-half (1½) hours at 220° C. 68 cubic centimeters of N-methylpyrrolidone was distilled. The reaction was then cooled to 200° C. to avoid frothing and 2.9 g. of boric acid added. The temperature again was raised to 225° C. and held. N-methylpyrrolidone was slowly distilled and 90 cubic centimeters were distilled over a period of seven hours at 220–225° C. Viscosity of the solution (hot melt) gradually increased and it was controlled by the amount of N-methylpyrrolidone distilled. When the polymerization was completed 830 cubic centimeters of N-methylpyrrolidone solvent was added in portions and the hot solution cooled with stirring to a homogeneous viscous solution. The final polymer had a Brookfield viscosity of 48.5 poises at 23.4° C. The percent solids or the polymer content was 24.5% determined by heating a 1 g. sample of solution for 12 minutes at 600° F.

EXAMPLE III

In a manner identical to Example No. II, the polymerization reaction was conducted with reagents in a 1:1:1 molar ratio. A mixture of 288 gm. of trimellitic anhydride (1.5 moles), 297 g. of methylenebisaniline (1.5 moles) and 170 g. of caprolactam was heated with 400 grams of N-methylpyrrolidone. The mixture was heated to 200–220° C. for 1½ hrs. and 5.84 gm. of boric acid catalyst was then added. Reaction temperature was increased slowly to 225–228° C. by distilling 207 cc. of N-methylpyrrolidone. This temperature was maintained for 6½ hours. Dilution with 2445 cc. of N-methylpyrrolidone gave a viscous solution with a Brookfield viscosity of 31 poises at 23.2° C. The polymer content (percent solids) for this solution was 25%.

EXAMPLE IV

In a manner identical to Example No. III polymerization was carried out using m-phenylenediamine as the reactant. Thus a solution of 163 gm. (1.5 moles) of m-phenylenediamine and 170 gm. of caprolactam (1.5 moles) in 400 ml. of N-methylpyrrolidone was reacted with 288 gm. of trimellitic anhydride (1.5 moles) at 70° C. The temperature/time flow chart followed exactly Example No. III and the viscous reaction mass was finally diluted with 900 ml. of N-methylpyrrolidone to give a polymer solution with a Brookfield viscosity of 26 poises measured at 22.4° C.

EXAMPLE V

A polyamide was prepared by the procedure of Example II from 250 g. of isophthalic acid, 297 g. methylenebis-aniline, and 170 g. of caprolactam. A maximum reaction temperature of 231° C. was reached and 5.84 g. of boric acid was used as catalyst. The polymer solution formed from dilution of the melt phase with N-methylpyrrolidone has a Brookfield viscosity of 10.6 poises at 24.4° C. at a 25% concentration.

EXAMPLE VI

A polymer was prepared by the procedure of Example V except that a mixture of isophthalic acid and trimellitic anhydride was reacted in a 1:1 molar ratio. Isophthalic acid (124.5 g.) and 144 g. of TMA, 297 g. of methylene-bis-aniline, and 170 g. of caprolactam were heated to 231° C. in 225 cc. of N-methylpyrrolidone. Reaction time was reduced to 7 hours. The final polymer solution viscosity, after dilution to 22.5% solids was 41 poises at 26.7° C. and this solution was used directly in wire coating.

EXAMPLES VII–XVI

These examples show comparative results of a sole-coat versus overcoated wire enamel system. The base coat is prepared as shown in Examples II–XVI. The overcoat is prepared as shown in Example I.

All wire coating was done on the same wire tower using conventional coating apparatus with 18 AWG copper wire. The sole coat coating was done with a 6-pass system. The overcoat coatings were prepared with 4 coats (passes) of the base coat polyamide-imide or polyamide and 2 coats (passes) of the polyamide-imide overcoat enamel. This generally produces a base coat diameter increase of 2.0–2.4 mils with a total diameter increase of approximately 3 mils.

The test utilized in Table I are the dielectric strength and the Dimethylacetamide Craze.

The DMAC Craze Test provides an indication of the solvent resistance of the insulating enamel applied to an electrical conductor. In this test insulated wire is wrapped around a mandrel three times the wire diameter for approximately 10 full turns. The coil produced is then dipped in dimethylacetamide for about 30 seconds and then washed immediately with water. Visual inspection under a low power microscope (about 5–10×) is used to determine the presence of the cracks or crazes that denote test failure.

The Dielectric Strength ASTM D–1676 test is an indication of the coatings ability to withstand the electrical stresses found in motor and transformer winding and its ability to function as an insulator. Values of this property represent the specific resistance of insulation to a continuously increasing voltage. Minimum acceptability is approximately 2.75 kilowatts per mil.

TABLE I

| Example | Enamel | Speed, f.p.m. | Cure temp., °F. | Bot. temp., °F. | Build, mil | Dielectric strength, k.v.p.m. | Dimethyl-acetamide craze test |
|---|---|---|---|---|---|---|---|
| VII | 1:1:1 TMA:MBA:CAPROLACTAM sole coat | 30 | 750 | 500 | 3.0 | 2.39 | Fail. |
| VIII | 1:1:1 TMA:MBA:CAPROLACTAM under AMIDE-IMIDE | 30 | 750 | 500 | 3.0 | 3.47 | Pass. |
| IX | 1:1:1 TMA:MBA:CAPROLACTAM as sole coat | 45 | 800 | 550 | 2.9 | 2.09 | Fail. |
| X | 1:1:1 TMA:MBA:CAPROLACTAM under AMIDE-IMIDE | 45 | 800 | 550 | 3.0 | 3.76 | Pass. |
| XI | 1:1:0.5 TMA:MBA:CAPROLACTAM as sole coat | 30 | 700 | 500 | 3.1 | 1.86 | Fail. |
| XII | 1:1:0.5 TMA:MBA:CAPROLACTAM under AMIDE-IMIDE | 30 | 700 | 500 | 2.8 | 2.83 | Pass. |
| XIII | 1:1:0.5 TMA:MBA:CAPROLACTAM as sole coat | 30 | 750 | 500 | 3.0 | 2.57 | Fail. |
| XIV | 1:1:0.5 TMA:MBA:CAPROLACTAM under AMIDE-IMIDE | 30 | 750 | 500 | 2.7 | 3.17 | Pass. |
| XV | 1:1:0.5 TMA:MBA:CAPROLACTAM as sole coat | 45 | 800 | 550 | 3.0 | 2.27 | Fail. |
| XVI | 1:1:0.5 TMA:MBA:CAPROLACTAM under AMIDE-IMIDE | 45 | 800 | 550 | 2.8 | 2.88 | Pass. |

NOTE.—TMA=Trimellitic Anhydride. MBA=Methylenebis Aniline. CAPROLACTAM=E-Caprolactam. The ratios are mole ratios of the reactants. AMIDE-IMIDE=The polyamide-imide polymer prepared as shown in Example I.

We claim:
1. An insulated electrical conductor coated with a base coat of a polyamide-imide or polyamide prepared by heating (1) trimellitic anhydride or isophthalic acid or mixtures thereof, (2) diprimary aromatic diamines and (3) lactams or amino acids, said base coat being cured on the conductor, and an overcoat of a polyamide-imide resin cured on the base coat, said polyamide-imide overcoat consisting essentially of recurring units of:

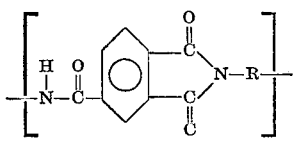

wherein R is a divalent carbocyclic aromatic organic radical.

2. The product of claim 1 wherein (1) is trimellitic anhydride.
3. The product of claim 1 wherein the polyamide-imide or polyamide base coat is prepared by heating at a temperature of about 200° C. to 250° C. (1) trimellitic anhydride or isophthalic acid or mixtures thereof, (2) diprimary aromatic diamines and (3) lactams wherein the molar ratio of the trimellitic anhydride or isophthalic acid to the aromatic diamines and to the lactams is from about 1:1:0.3 to about 1:1:2.5.
4. The product of claim 3 wherein the diprimary diamine is methylenebis aniline.
5. The product of claim 3 wherein the diprimary diamine is oxybisaniline.
6. The product of claim 3 wherein the lactam is E-caprolactam.
7. The product of claim 3 wherein the lactam is caprolactam and the molar ratio of trimellitic anhydride to aromatic diamine to caprolactam is about 1:1:0.4 to about 1:1:1.8.
8. The product of claim 1 wherein the amino acid is 4-aminobutyric acid.
9. The product of claim 1 wherein the divalent carbocyclic aromatic organic radical is

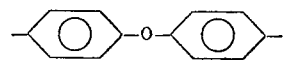

10. The product of claim 1 wherein the divalent carbocyclic aromatic organic radical is

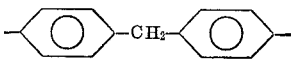

References Cited
UNITED STATES PATENTS

| 3,428,486 | 2/1969 | George | 117—218 |
| 3,554,984 | 1/1971 | George | 117—218 X |
| 3,555,113 | 1/1971 | Sattler | 260—841 |
| 3,361,593 | 1/1968 | Sattler et al. | 117—218 |
| 3,541,038 | 11/1970 | Nakano et al. | 117—232 X |
| 3,544,504 | 12/1970 | Ulmer | 117—232 X |
| 3,541,038 | 11/1970 | Nakano et al. | 117—232 X |

RALPH HUSACK, Primary Examiner

U.S. Cl. X.R.
117—128.4, 232; 260—78 A, 78.5 R